Dec. 5, 1961    A. B. ROTH ET AL    3,011,333
CENTRIFUGAL TESTING MACHINE
Filed Dec. 19, 1958    3 Sheets-Sheet 1
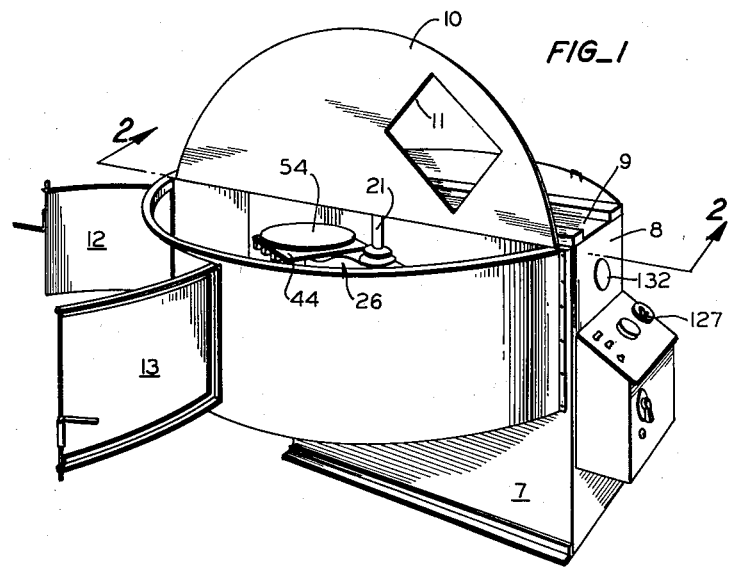
FIG_1
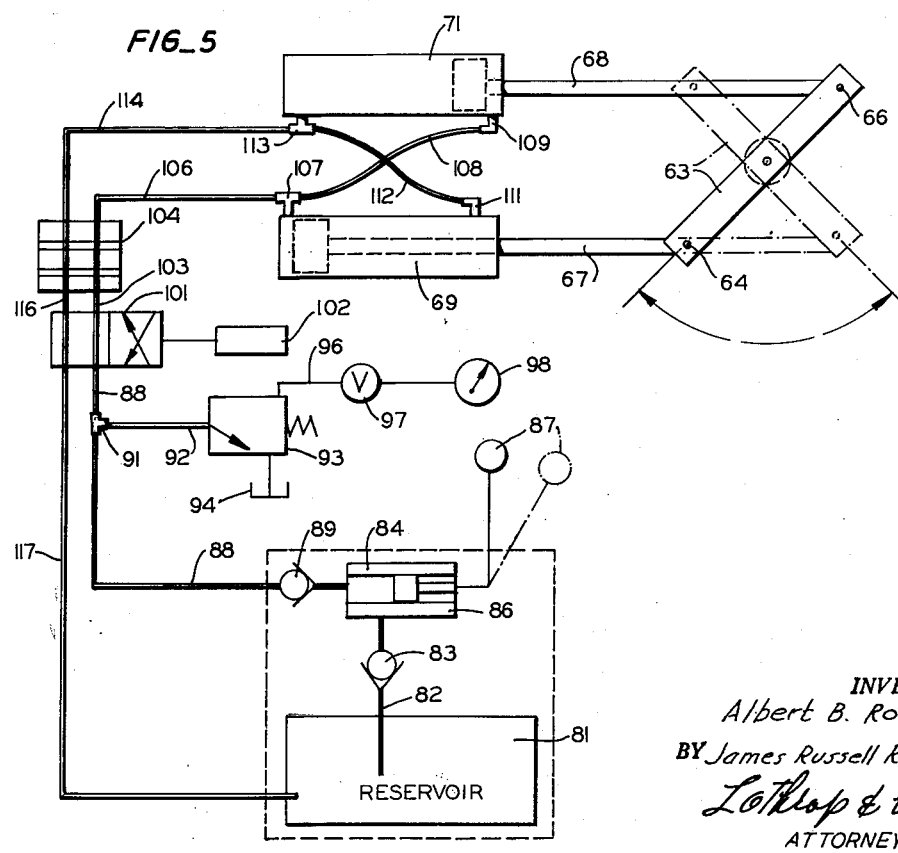
FIG_5
INVENTORS
Albert B. Roth
BY James Russell Robertson
Lothrop & West
ATTORNEYS

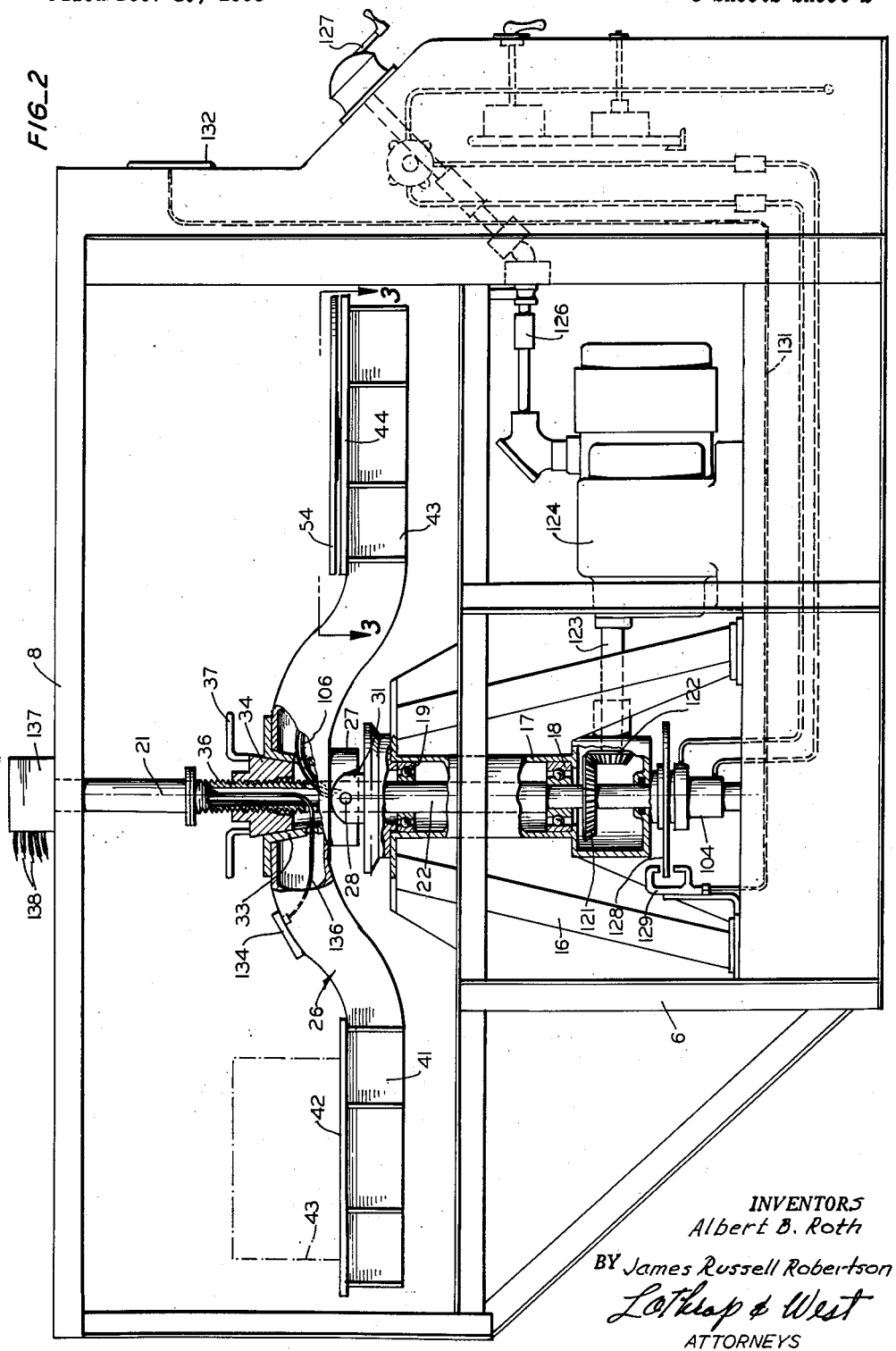

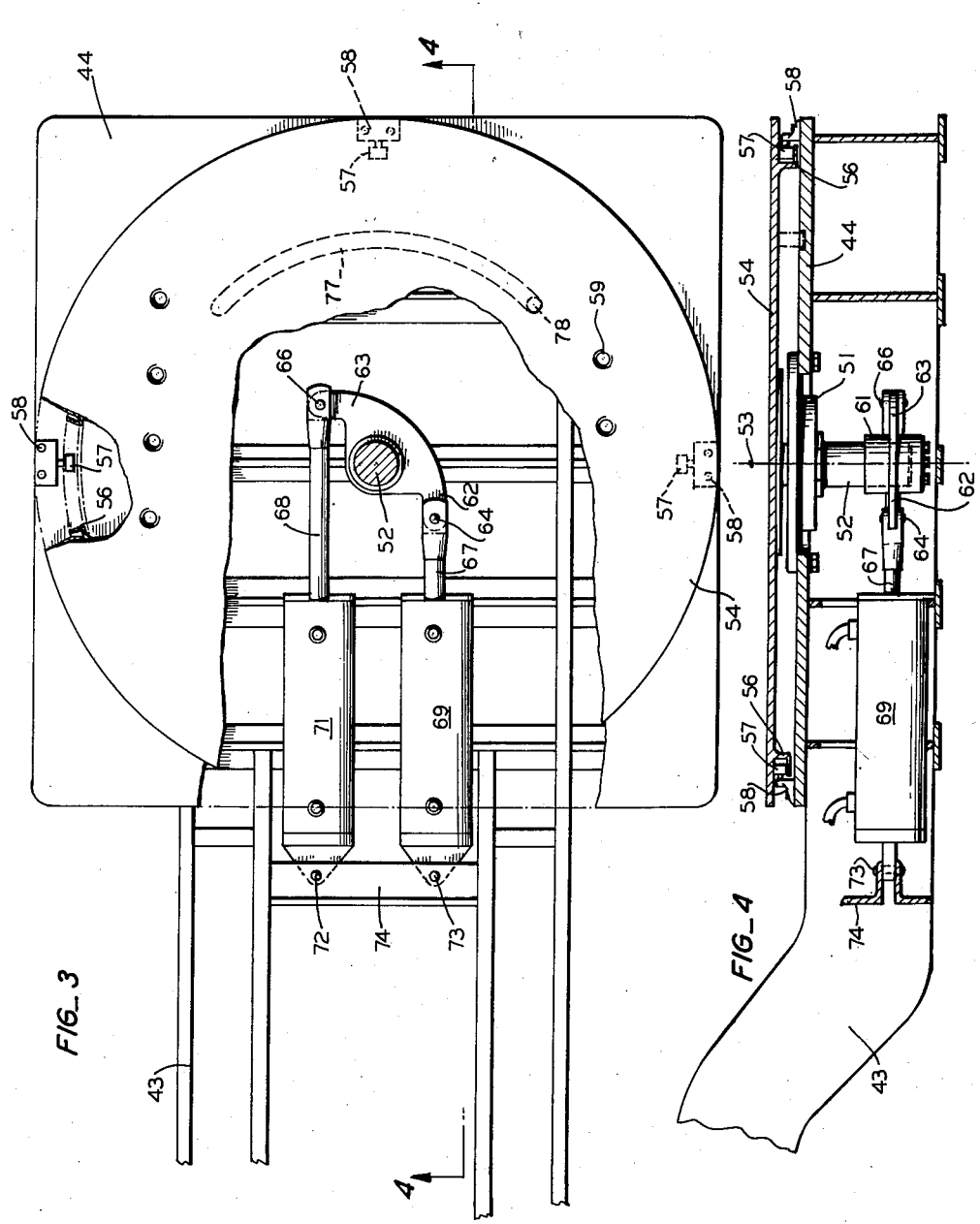

high performance devices. While centrifugal
3,011,333
CENTRIFUGAL TESTING MACHINE
Albert B. Roth, 1648 Springbrook Road, Walnut Creek, Calif., and James R. Robertson, 3335 Bruce St., Oakland, Calif.
Filed Dec. 19, 1958, Ser. No. 781,560
3 Claims. (Cl. 73—1)

The invention relates generally to apparatus for whirling specimens at selected speeds in order to be able to test them under various operating conditions wherein the accelerations are varied. Equipment of this sort is particularly useful in testing components for missiles and comparable high performance devices. While centrifugal machines for this purpose have been in use for a number of years they have not been sufficiently versatile to cope with the advancements in design in this field. The necessity has arisen for more comprehensive test equipment.

It is therefore an object of the invention to provide a centrifugal testing machine in which the item being tested can not only be put through the usual routine but can also be altered in its attitude during tests in order to explore the effects of centrifugal force upon the item in different orientations.

Another object of the invention is to provide a centrifugal testing machine in which the item being tested can be manipulated during the test with the manipulation being accomplished from a convenient operator station.

A still further object of the invention is to provide a centrifugal testing machine having facilities for variously orienting the test specimen during operation yet which is undisturbed in its general testing capabilities by the presence and operation of the orienting mechanism.

A still further object of the invention is to provide an improved centrifugal testing machine.

Other objects, together with the foregoing, are attained in the embodiment of the invention described in the accompanying description and illustrated in the accompanying drawings, in which:

FIGURE 1 is a perspective of a centrifugal testing machine constructed in accordance with the invention, portions of the casing around the machine being open to disclose the interior.

FIGURE 2 is a cross-section, the plane of which is indicated by the line 2—2 of FIGURE 1, certain portions of the mechanism being broken away to disclose the interior construction on a different, symmetrical vertical plane.

FIGURE 3 is a partial plan of the mechanism taken in a plane indicated by the line 3—3 of FIGURE 2, other portions being broken away to reveal the interior construction.

FIGURE 4 is a cross-section of the mechanism shown in FIGURE 3, the plane of section being indicated by the line 4—4 of FIGURE 3.

FIGURE 5 is a diagram or schematic layout showing the hydromechanical circuit.

While the centrifugal testing machine according to the invention can be embodied in a number of different ways it has been successfully embodied for commercial application substantially as shown herein. In this form of the device there is provided a base 6 or frame conveniently fabricated of the usual structural shapes to provide a framework within a housing having a lower substantially rectangular enclosure 7 and an upper substantially circular cylindrical enclosure 8. The upper enclosure has a stationary top 9 and a swinging cover 10 with an inspection window 11 therein. The cover 10 is normally in a horizontal plane but is opened for access to the interior. The upper housing 8 includes a pair of swinging doors 12 and 13 also affording access to the interior.

Within the housing and forming part of the frame 6 is a pedestal 16 carrying a bearing tube 17 mounting a lower bearing 18 and an upper bearing 19. Disposed in these bearings for rotation about a first vertical axis 21 is a hollow beam support 22. This support extends vertically through the frame or base 6. It stops short of the bottom of the frame although it extends above the frame top 9.

The beam support 22 is arranged not only for rotation about the first axis 21 but is also held against displacement along that axis by axial thrust or load. The support 22 serves to carry a balance beam 26 adjacent its center. A depending bracket 27 projects from the beam 26 and is mounted to rock on pins 28 aligned on a transverse axis normal to the first vertical axis 21. These pins also are engaged with ears 31 conencted to the beam support 22 so that as the beam support rotates about the axis 21, the balance beam 26 is comparably rotated therewith. Because of the connecting pins 28 the balance beam 26 is free to rock about the horizontal axis of the pins 28 and so can be brought initially into static balance.

Since the balance beam 26 is not always to be left free, it is fabricated to include a central cone 33 with which a conical plug 34 is adapted to engage. The plug is threaded onto the threaded exterior 36 of the beam support and is provided with rotating handles 37. When the plug 34 is rotated and lifted out of engagement with the cone 33 the balance beam is free to tilt and find a point of rest. When the plug 34 is turned down into engagement with the cone 33 the balance beam is locked to the beam support.

One arm 41 of the balance beam 26 is provided with a platform 42 on which a separate balance weight 43 can be removably fastened. The weight 43 is adjusted from time to time so as to balance statically the weight of the item being simultaneously tested. Preferably, the arm 41 is offset so that the plane of the plate 42 is substantially coincident with or contains the axis of the pins 28. Since the balance weight 43 does not have a very great height, its center of mass is near the plane of the platform 42 and no substantial dynamic unbalance is introduced. Comparably, the other arm 43 of the balance beam 26 is symmetrically offset so that a plate 44 on the upper face thereof is coplanar with the plate 42 and dynamic unbalance is minimized.

Pursuant to the invention means are provided in connection with the arm 43 of the balance beam for supporting a test specimen for manipulation during test. For that reason there is provided on the plate 44 a journal mounting 51. This serves as the support for a stub shaft 52 designed for rotation relative to the balance beam 26 about a second vertical axis 53. This axis 53 is adjacent the outer end of the arm 43 of the balance beam. The stub shaft 52 projects upwardly above the bearing 51 and carries a test table 54. This is preferably circular in outline and planar in a plane parallel to that of the plate 44.

To assist the bearing 51 in appropriately mounting the test table 54 for rotation about the second vertical axis 53, the test table 54 near its periphery is provided with a circular channel 56 opening radially outwardly to receive a plurality of antifriction rollers 57. These are carried on mounts 58 secured to the plate 44 so that the rotation of the test table 54 is accurately established not only by the single central bearing 51 but also by the numerous rollers 57. The test table 54 is provided with a plurality of fastening apertures 59 so that a specimen for test mounted on the test table can be securely fastened in place. Preferably the arrangement is such that the center of mass of the test specimen is close to the plane of the pivot pins 28 and is substantially in the same horizontal plane as that of the counterbalance weight 43 so that no undue rocking couples about the first vertical axis 21 are introduced.

In accordance with the invention means are provided for rotating the test table 54 to the desired extent. In most testing it is desired to operate the specimen when oriented in one position and then again when oriented in another position at right angles or 90 degrees to the first test position. To that end the stub shaft 52 is provided with a hub 61 having extended arms 62 and 63. These arms are connected by pivot pins 64 and 66 to piston rods 67 and 68 projecting from and forming part of hydraulic jacks 69 and 71. These jacks are mounted by pivot pins 72 and 73 on a cross-brace 74 joined to the structure of the balance beam 26. In all positions, the jacks and connected mechanism are balanced on opposite sides of the radius of the beam 26 passing through the axis 53. This radius can also be termed the horizontal beam axis intersecting the first vertical axis 21 and the second vertical axis 53.

The stroke of the piston rods 67 and 68 is such that they produce at least a 90 degree rotation of the test table 54, preferably with symmetrical movement on either side of the central radius of the arm 43. A milled arcuate slot 77 and a pin 78 provided in the plate 44 and the test table 54 limit the rotation therebetween to 90 degrees and form firm stops against which the hydraulic jacks press to hold the test cable tight.

For supplying hydraulic fluid to operate the jacks 69 and 71 and for accommodating return fluid therefrom, an appropriate hydraulic circuit is provided, as seen in FIGURE 5. The hydraulic circuit starts from a reservoir 81 disposed at the bottom of the base framework 6. From the reservoir an inlet line 82 leads through a check valve 83 to the cylinder 84 of a hand pump 86. This has an operating handle 87 for convenient manipulation by the user. The pump cylinder 84 is connected through a lead 88 having an outlet check valve 89 therein to a T 91. A short lead 92 extends to a relief valve 93 having an adjustment 94 thereon so that pressures in excess of an adjusted or set value force spillage of hydraulic fluid back to the reservoir 81.

A line 96 leads through a protector valve 97 to a pressure gauge 98. From the T 91 the lead 88 extends to a four-way valve 101 having a mechanically operated control 102 for switching hydraulic flow. A duct 103 leading from the valve 101 extends through a rotatable coupling 104 mounted on the axis 21 and feeding into a line disposed within the interior of the hollow beam support 22 so that hydraulic fluid is transmitted from the stationary base to the interior of the rotating elements. The duct 103 is continued above the rotating joint by a flexible lead 106 extending to a T 107 affording access to one end of the hydraulic jack 69. An extension 108 from the T 107 connects to a fitting 109 affording access to the opposite end of the other hydraulic jack 71.

In a symmetrical fashion, the jack 69 has a fitting 111 connected to the end opposite the T 107. A line 112 extends to a T 113 in the end of the jack 71 opposite the fitting 109. A flexible conduit 114 leads from the T 113 back through the rotary joint connector 104. This flow path is extended by a duct 116 to the four-way valve 101. A pipe 117 continues the hydraulic circuit from the valve 101 back to a discharge point in the reservoir 81.

In the operation of this system, the operator by setting the valve 101 can take pressure generated by manipulation of the hand pump 84 from the conduit 88 and dispatch it either into the conduit 103 or into the conduit 116. Pressure is then exerted on the opposite ends of the respective jacks 69 and 71 to produce a moment and to rotate the stub shaft 52 in one sense of rotation up to the stop effective in the 90 degree position.

When the test table is to be moved to its opposite extreme position, the mechanism 102 is actuated to reverse the valve 101. When the valve is reversed the pressure connection is likewise reversed to the appropriate one of the conduits 103 and 116 so that the opposite ends of the respective jacks 69 and 71 are supplied with pressure. As the jacks operate, fluid previously in them at the opposite ends is expelled and is returned to the reservoir 81.

If at any time there is a large obstruction to the rotation of the test table or after the test table gets into its end position against the stop or if the pressure becomes high due to any other reason the relief valve 93 opens and prevents excessive pressure build-up. With this hand operated hydraulic mechanism, the test table can be moved from one extreme position to the other at any time whether the mechanism is stationary or whether it is revolving at high speed. Because of the hydraulic nature of the actuating mechanism the test table is urged by hydraulic pressure against its stop in either extreme position so that vibration incident to the operation of the mechanism does not dislodge the test table.

The hydraulic mechanism as installed on the arm 43 is generally symmetrical about the radius or diameter of the arm so that in either extreme position there is no substantial change in or shifting of weight. An initial balance of the arm at the beginning of testing is therefore maintained and is not disturbed by the operation of the hydraulic positioning apparatus.

In order to drive the rotary mechanism, the beam support adjacent the lower bearing 18 is provided with a bevel gear 121 meshing with a bevel pinion 122 at one end of a drive shaft 123. This shaft connects to a variable speed drive motor 124 having a control 126 terminating in a handle 127 at the operator's station. With this device, the rate of acceleration and the rotary speed of the balance beam can be regulated.

As an auxiliary, the hollow beam support 22 adjacent its lower end and near the hydraulic slip joint 104 carries a speed disc 128 which cooperates with an electro-optical observer 129 connected by a lead 131 to a gauge 132 so that an accurate indication of the rotary speed of the mechanism can be had at all times.

As an additional mechanism, the balance beam 26 is provided with a terminal board 134 to which electrical instrumentation connections can be made from any part of the balance beam. The board 134 itself is provided with appropriate leads 136 leading flexibly to the interior of the hollow beam support 22. The electrical leads enter the hollow support near the point at which the hydraulic leads 106 and 114 emerge from the support. The electrical leads are carried upwardly to the top of the casing at which point a multiple slip ring mechanism 137 is installed. The leads 138 extend to a suitable points for further use.

What is claimed is:

1. A centrifugal testing machine comprising a base, a beam support, means mounting said beam support on said base for rotation about a first vertical axis, a balance beam, means for mounting said balance beam adjacent its center for rocking movement about a horizontal axis on said beam support, a test table, means for mounting said test table on said balance beam for rotation about a second vertical axis adjacent one end of said balance beam, means interposed between said test table and said balance beam for rotating said test table about said second axis, means on said test table and said beam for resisting said rotating means at two rotated positions of said test table on said balance beam, means on said base for actuating said rotating means, and means including a rotary slip connection concentric with said first vertical axis for continuously connecting said actuating means and said rotating means.

2. A centrifugal testing machine comprising a base, a beam support, means for mounting said beam support on said base for rotation about a first vertical axis, a balance beam, means for mounting said balance on said beam support, a test table, means for mounting said test table on said balance beam for rotation about a second vertical axis adjacent one end of said balance beam, a hydraulic jack connected to said balance beam and to said test table for urging said test table to rotate about said second vertical axis, hydraulic control mechanism on said base, means effective during full rotation of said balance beam on said base for hydraulically connecting said control mechanism and said hydraulic jack, and stop means interengaging said test table and said balance means for holding said test table against the urgency of said hydraulic jack and in a selected rotated position relative to said balance beam.

3. A centrifugal testing machine comprising a base, a balance beam, means for supporting said balance beam on said base for rotation about a first vertical axis, a test table, means for mounting said test table on said balance beam for rotation about a second vertical axis, a pair of arms connected to said test table and extending substantially diametrically from said second axis, a pair of hydraulic jacks connected to said arms and to said balance beams and disposed substantially symmertically with respect to a radius of said balance beam passing through said vertical axis, hydraulic control means on said base, and means for connecting said hydraulic control means to said hydraulic jacks.

References Cited in the file of this patent

UNITED STATES PATENTS

| | | |
|---|---|---|
| 443,695 | Copeland | Dec. 30, 1890 |
| 1,518,288 | Wolpert | Dec. 9, 1924 |
| 2,109,505 | Rue et al. | Mar. 1, 1938 |
| 2,301,967 | Nosker et al. | Nov. 17, 1942 |
| 2,452,031 | Allnutt et al. | Oct. 26, 1948 |
| 2,799,163 | Armstrong et al. | July 16, 1957 |
| 2,924,092 | Bourns et al. | Feb. 9, 1960 |

OTHER REFERENCES

Publication "Genisco G. Accelerator," pages 2 and 3, received January 31, 1952. (Copy in 73–1.)